United States Patent [19]

D'Amato

[11] Patent Number: 5,011,004
[45] Date of Patent: Apr. 30, 1991

[54] CONVEYOR DRIVE ASSEMBLY

[75] Inventor: Mark D'Amato, Montreal, Canada

[73] Assignee: D.E.M. Controls of Canada, Montreal, Canada

[21] Appl. No.: 377,422

[22] Filed: Jul. 7, 1989

[51] Int. Cl.$^5$ .............................................. B65G 13/06
[52] U.S. Cl. .................................... 198/791; 198/789
[58] Field of Search ................ 198/780, 781, 789, 791

[56] References Cited

U.S. PATENT DOCUMENTS

| 778,613 | 12/1904 | Ward . | |
|---|---|---|---|
| 895,621 | 8/1908 | Fawell . | |
| 949,504 | 2/1910 | Sexton . | |
| 2,031,054 | 2/1936 | McCarthy | 198/204 |
| 2,135,838 | 1/1936 | Paxton | 198/127 |
| 2,718,296 | 9/1955 | Johnson | 198/264 |
| 2,748,919 | 6/1956 | Britton et al. | 198/127 |
| 2,921,670 | 1/1960 | Albers | 198/213 |
| 3,042,185 | 7/1962 | Welch III | 198/160 |
| 3,082,774 | 3/1963 | Benton et al. | 134/63 |
| 3,313,199 | 4/1967 | Houvener et al. | 85/66 |
| 3,416,638 | 12/1968 | Buck | 193/37 |
| 3,440,900 | 4/1969 | Neal | 37/06 |
| 3,457,234 | 7/1969 | Gianatasio | 260/75 |
| 3,667,589 | 6/1972 | Constable | 198/127 |
| 4,015,706 | 4/1977 | Goffredo et al. | 198/780 |
| 4,205,746 | 6/1980 | Olson et al. | 198/791 |

FOREIGN PATENT DOCUMENTS

| 0292613 | 11/1988 | European Pat. Off. | 198/791 |
|---|---|---|---|
| 1280994 | 1/1962 | France . | |
| 0011451 | 1/1980 | Japan | 198/791 |
| 0011483 | 1/1980 | Japan | 198/791 |
| 0007111 | 1/1986 | Japan | 198/791 |

OTHER PUBLICATIONS

General Processing Guide for TINBOND TM 600, E. I. duPont de Nemours Corp., Wilmington, Del.
File Wrapper for U.S. patent application Ser. No. 433,482 to D. L. Goffredo and Conrad D. Shakley.
File Wrapper for U.S. patent application Ser. No. 198,622 to D. L. Goffredo and Conrad D. Shakley.

Primary Examiner—D. Glenn Dayoan
Attorney, Agent, or Firm—Stetina and Brunda

[57] ABSTRACT

A conveyor drive assembly which is configured and constructed to resist the effects of various chemical substances, while accomplishing controlled and regulated rotation of a plurality of conveyor rollers. A preferred drive assembly in accordance with the invention comprises an elongate non-cylindrical drive shaft having a plurality of roller drivers or worms disposed about the drive shaft at spaced locations along the length thereof. Spacers and various bearings may also be positioned upon the shaft. The shaft, worms, spacers, bearings and other components are formed of plastic or other chemically resistant material. The non-cylindrical configuration of the drive shaft enables the drive shaft to rotatably engage the worms and/or bearing members without the need for machined keyways, set screws or other cut away regions formed in the exterior of the shaft as would result in weakening of the shaft or cause retention of corrosive chemicals therein. In certain applications wherein glass reactive chemicals are employed, the drive shaft is formed of plastic which is devoid of glass reinforcement fibers. Also, any glass bearings are replaced by non-glass material such as ceramic or nylon.

36 Claims, 3 Drawing Sheets

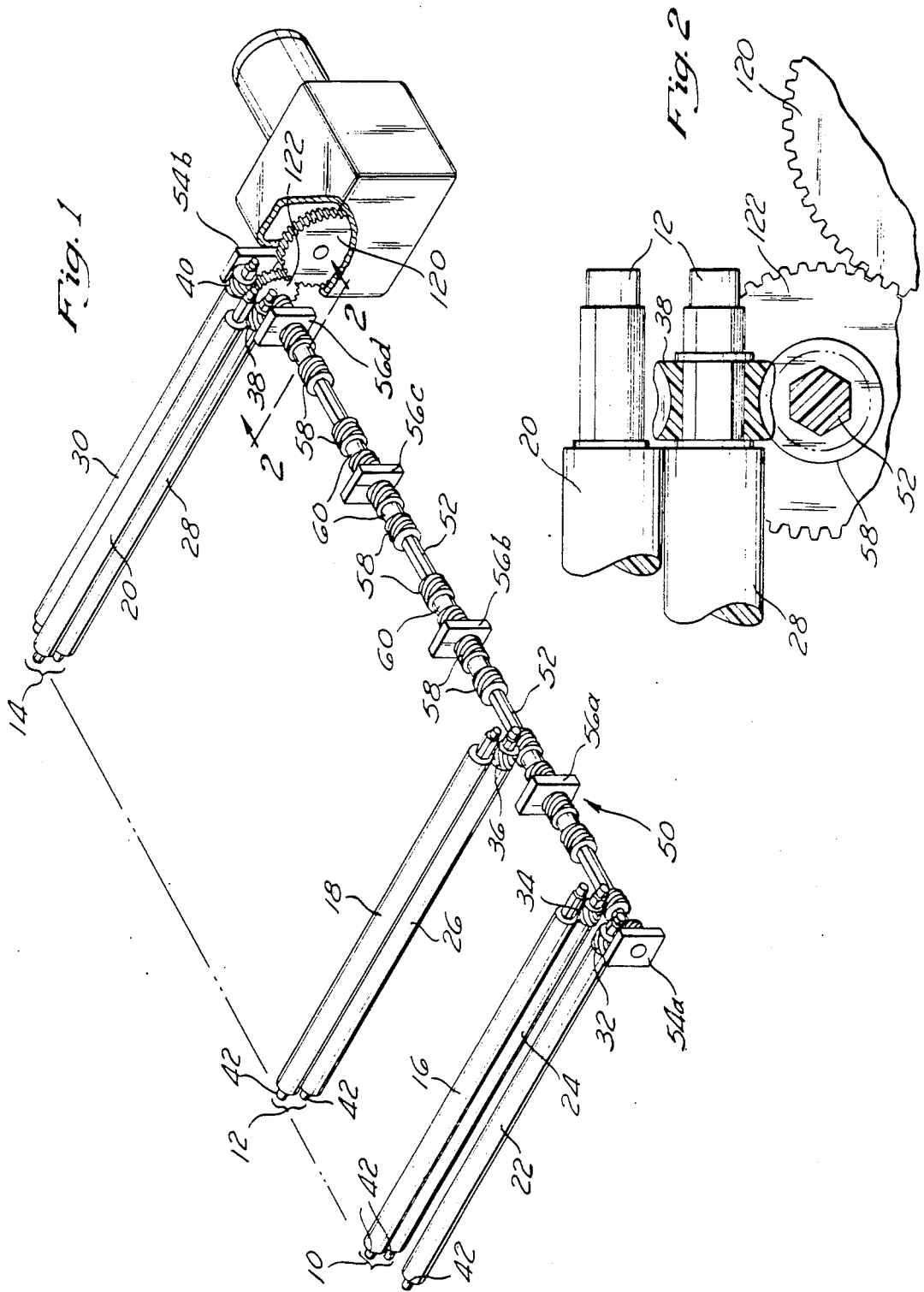

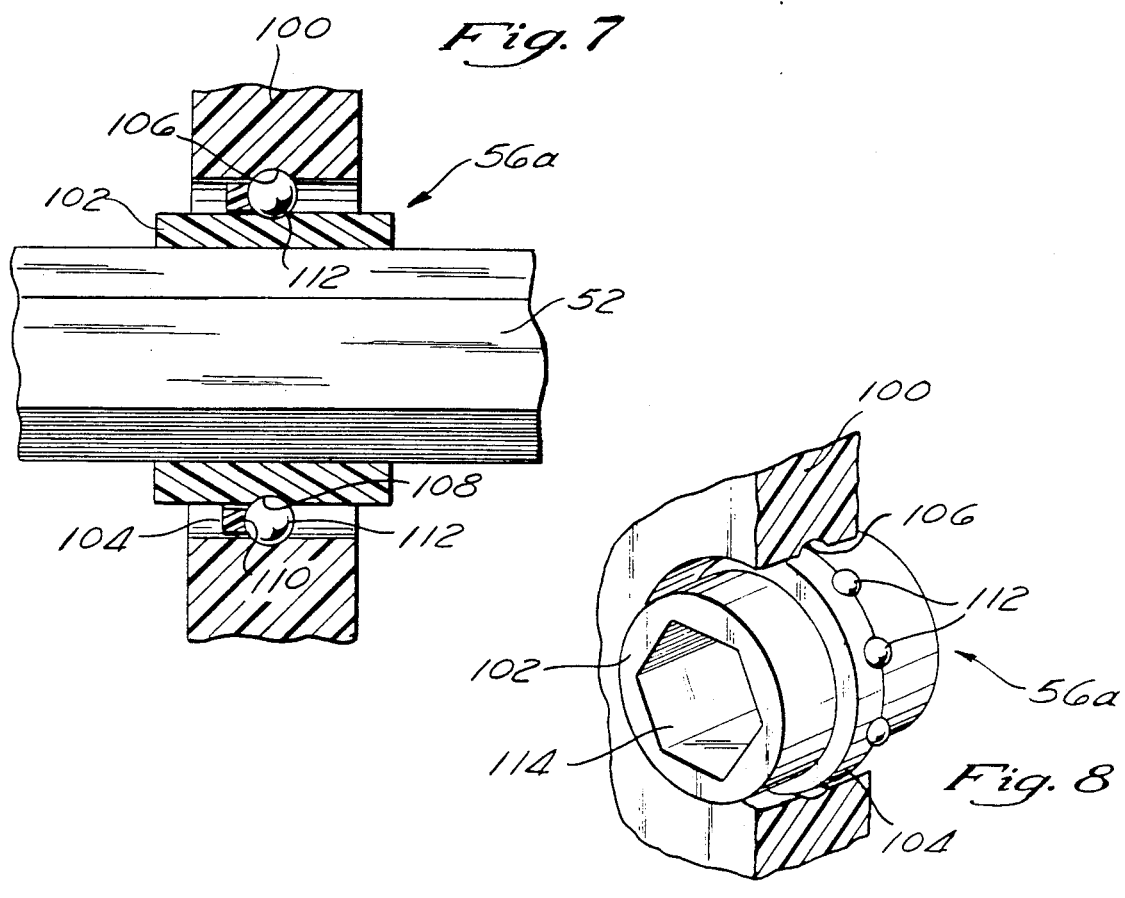
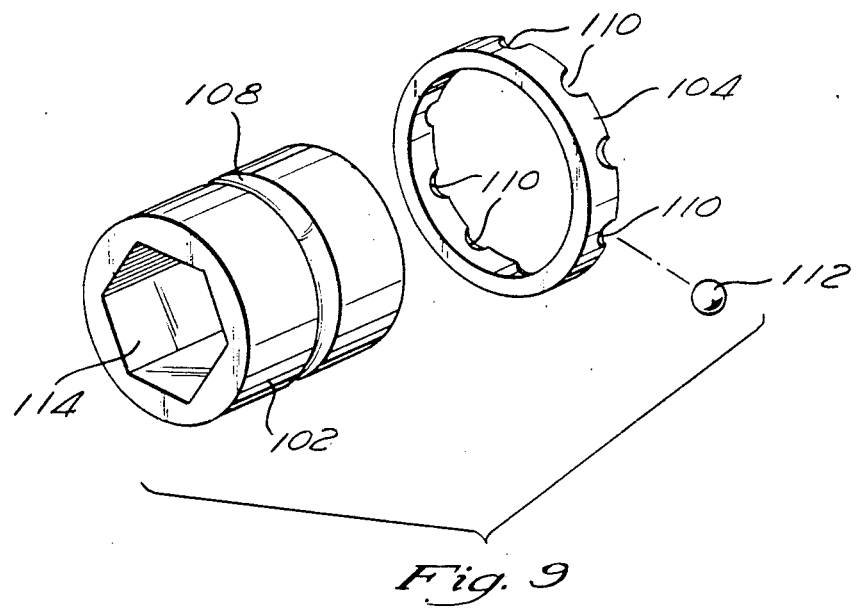

5,011,004

CONVEYOR DRIVE ASSEMBLY

FIELD OF THE INVENTION

The present invention pertains generally to chemical processing machinery and more particularly to an improved conveyor drive assembly which is highly resistant to the effects of various chemical agents.

The present invention is particularly applicable to the machinery used in the manufacture of printed circuit boards and will be described herein with particular reference thereto. It must be appreciated, however, that the invention has extremely broad utility and may be used in connection with many types of conveyors and in applications other than circuit board manufacturing.

BACKGROUND OF THE INVENTION

Automated and semi-automated chemical processing machines typically employ conveyors to move work pieces through one or more stations wherein the work pieces undergo one or more chemical treatments (e.g. spraying, immersing, dusting etc.) For example, in the art of circuit board manufacturing, conveyors are routinely used to move circuit boards through chemical solution sprays, rinse sprays, solution dip tanks and the like for the purpose of applying sequential chemical treatments to the circuit board surfaces. Examples of some of the chemicals routinely employed in circuit board manufacturing operations include, but are not limited to the following:

Etchants ferric chloride
cupric chloride
sulfuric peroxide
ammonium hydroxide-cupric chloride mixture

Alkaline Cleaners caustic soda
sodium hydroxide

Micro Etchants sulfuric acid based solutions
hydrochloric acid based solutions
peroxymonosulfates
other oxidizing chemicals commonly used to clean copper

Developers/Strippers sodium hydroxide
potassium hydroxide

Abrasive Suspensions pumice/water slurry

Electrolytic and Electrolysis Plating Solutions copper
tin
nickel
gold

Other thioureas
stannous sulfate
fluoboric acid laced solutions
chromates

In view of the wide variety of chemical agents used in various circuit board manufacturing machines, it is desirable that the working portions of each machine (e.g. its conveyor) be configured and constructed so as to minimize or prevent possible degradation and/or corrosion thereof as may be caused by some or all of these chemical agents.

One specific type of conveyor commonly employed in circuit board manufacturing machines comprises a plurality of vertically opposed roller pairs lying parallel to one another and aligned such that circuit boards may pass therebetween and therethrough. The upper and lower rollers of each roller pair are rotatable in opposite directions to facilitate passage of the circuit boards therebetween.

Another type of conveyor employed in circuit board manufacturing machinery is the "belt" or "strap" type conveyor wherein one or more individual belts or straps are extended around drive rollers. Rotation of the drive rollers then results in corresponding movement of the belts or straps. Circuit boards placed in contact with the belts or straps will be thereby moved along the conveyor path.

Such conveyor assemblies of the prior art have typically utilized standard mechanical drive trains for rotating and propelling the individual conveyor-driving rollers. However, such standard mechanical drive trains are less than optimal in circuit board manufacturing and other chemical processing applications because they are not sufficiently resistant to the effects of certain chemicals used therein and do not lend themselves to complete and easy rinsing or decontamination to remove residual chemical solutions therefrom. For example, many of the prior art drive trains incorporate numerous metal components (e.g. metal drive shafts, metal worms, metal bearings) which are subject to deleterious effects (e.g. corrosion) of certain chemicals routinely employed in circuit board manufacturing applications.

Accordingly, there exists a need in the art for an improved conveyor drive assembly which is resistant to the effects of various chemical substances so as to be useable in conveyorized chemical process machines.

BRIEF DESCRIPTION OF THE INVENTION

The present invention comprises a conveyor drive assembly which is configured and constructed to resist the effects of various chemical substances, while accomplishing controlled and regulated rotation of a plurality of conveyor rollers.

In accordance with the invention, there is provided a drive assembly for rotationally driving a plurality of conveyor rollers, said drive assembly comprising (a) an elongate, non-cylindrical drive shaft having first and second ends; and (b) a plurality of roller drivers or worms disposed about the drive shaft at space locations along the length thereof.

The drive shaft of the present invention is non-cylindrical (e.g. polygonal) in configuration. In a preferred embodiment the drive shaft is hexagonal in configuration Such non-cylindrical configuration of the drive shaft permits the outer surface of the drive shaft to rotatably grip or engage the inner aperture surfaces of the worms or other elements positioned on the shaft, without the need for forming machined keyways, set screw receiving indentations or other affixation means in the outer surfaces of the shaft and/or the inner aperture surfaces of the worms and/or other elements positioned on the shaft.

Components of the drive assembly are preferably formed of materials that are resistant to any deleterious effects of the chmeicals to be used in the machine. In a preferred embodiment, the drive shaft comprises a hexagonal rod of fiberglass reinforced plastic (FRP) having a vinyl coating disposed thereon. In machines destined to be used with glass degrading chemicals such as fluoboric acid the drive shaft may be formed of polyvinyl chloride (PVC) or other nonglass materials which are devoid of glass fillers, fiberglass reinforcement materials, or other components which may be attacked or affected by the glass degrading chemicals. Additionally, the gears, chains or other elements which drive the shaft may be formed of plastic material such as nylon to avoid chemical degradation thereof.

A plurality of bearings may be positioned along the drive assembly. Such bearings serve to hold the drive assembly in its operative position (i.e. in contact with conveyor rollers) while allowing the desired rotation of the drive shaft and/or other rotating components. It is preferable that all bearing components be formed of materials which are resistant to the chemical environment in which the machine is used. Thus, in most circuit board manufacturing applications, the bearing components are preferably formed of plastic materials (e.g. nylon, polytetraflouroethylene, polyethylene, etc.) and the rolling members or balls are preferably formed of hard plastic. For example, rolling members made of glass, and preferably chemical resistant glass (e.g. borosillicate glass), may be used with virtually all circuit board manufacturing chemicals except certain glass degrading chemicals (e.g. fluoboric acid ($HBF_4$)) employed in some specialized applications. In embodiments intended for use with glass degrading chemicals (e.g. fluoboric acid) the rolling members or balls will be formed of ceramic material and/or nylon rather than glass.

In a presently preferred construction of the drive assembly, axial thrust type bearings are mounted on either end of the drive shaft to support and rotatably hold the drive shaft while preventing longitudinal axial movement of the shaft in either longitudinal direction. Additionally, a plurality of open race type inner bearings are positioned at locations between the two ends of the drive shaft. Such inner "open race" type bearings serve to rotatably support and affix the drive shaft in its desired position relative to the conveyor rollers. Such inner bearings may remain longitudinally slideable on the drive shaft and do not serve to restrain the drive shaft from undergoing longitudinal axial movements. Because these inner bearings are longitudinally slidable onto and upon the shaft, assembly of the shaft is accomplished with relative ease. Additionally, each open race type bearing may serve to splice and hold together individual short segments of the overall drive shaft.

Further aspects of the invention will become apparent to those skilled in the art upon reading and understanding of the following detailed description and the accompanying drawings.

BRIEF DESCRIPTION OF THE DRAWINGS

FIG. 1 is a perspective view of a drive assembly of the present invention.

FIG. 2 is an enlarged view taken at line 2—2 of FIG. 1.

FIG. 7 is a cross-sectional view taken through line 7—7 of FIG. 3.

FIG. 8 is a perspective view of a portion of a preferred inner bearing mountable on the hexagonal drive shaft of the present invention.

FIG. 9 is an exploded view of the bearing of FIG. 8.

Figure 3:
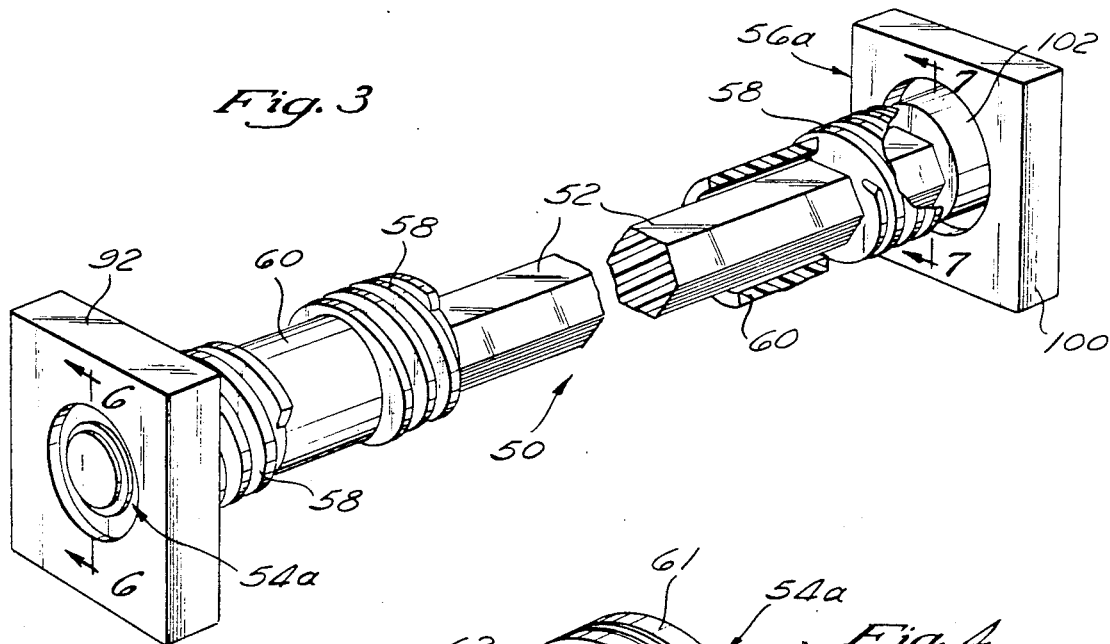
FIG. 3 is a perspective view of a section of a drive shaft assembly of the present invention.

DETAILED DESCRIPTION OF A PREFERRED EMBODIMENT i. Structure of the Preferred Embodiment

The following detailed description and the accompanying drawings are provided for purposes of illustrating and explaining a presently preferred embodiment of the invention and are not intended to limit the scope of the invention in any way.

Referring to the drawings, FIG. 1 shows a partial perspective view of a preferred conveyor and drive assembly of the present invention.

The conveyor comprises a plurality of vertically opposed roller pairs 10, 12, 14 aligned in generally parallel relationship along a substantially horizontal conveyor path. Each roller pair 10, 12, 14 comprises an upper roller 16, 18, 20 and a lower roller 22, 24, 26, 28, 30. Each such roller 16-30 is formed of a generally cylindrical, substantially rigid roller core (e.g. plastic, fiberglass, reinforced plastic or metal) having a pliable and/or elastic coating of soft PVC or similar rubber-like material (e.g. EPDM, neoprene) disposed on the outer surface thereof. In the embodiment shown, the rigid roller cores are of hexagonal configuration while the outer coverings are substantially cylindrical on their outer surfaces. By such configuration, the hexagonal roller core will rotatably engage the outer cover and slippage of the outer cover will be minimized.

Worm gears 32, 34, 36, 38, 40 are formed at and/or mounted upon the ends of lower rollers 22, 24, 26, 28, 30.

The nips 42 of the rollers are firmly, rotatably connected to a surrounding machinery structures and/or members so as to hold the rollers in their desired positions. Upper and/or lower rollers of each pair may be mounted in a floating manner. Such floating rollers are permitted to float up and down to permit passage of various sized work pieces therebetween. In a generally preferred embodiment the upper rollers 16, 18, 20 are mounted in a floating manner while the lower rollers 22, 24, 26, 28, 30 are mounted in a non-floating manner. Thus, only the upper rollers 16, 18, 20 will ride up and down as circuit boards or other work pieces pass through the space between the upper and lower roller of each roller pair 10, 12, 14.

A drive assembly 50 of the present invention extends longitudinally along the side of the conveyor roller pairs 10, 12, 14. Such drive shaft assembly 50 comprises a non-cylindrical, hexagonal drive shaft member 52. For use in most circuit board manufacuturing operations and other chemical environments wherein corrosive substantces are employed, the drive shaft 52 may be made of rigid fiberglass reinforced plastic with a thin polyvinyl chloride coating disposed on the outer surfaces thereof. In the embodiment shown, the drive shaft 52 comprises a single elongate member sized to extend the entire length of the conveyor. However, it will be appreciated that the drive shaft 52 may be formed of a series of relatively short component members fixed in an end to end arrangement such that a common longitudinal axis extends therethrough.

A plurality of bearings are mounted at various positions along the drive shaft assembly. Axial thrust bearings 54a, 54b are mounted at the extreme ends of the drive shaft assembly 50. Additionally, a plurality of inner bearings 56a, 56b, 56c and 56d are mounted at intervals along the drive shaft assembly 50 between the end mounted thrust bearings 54a and 54b. In this preferred embodiment, the individual bearing blocks 56a, 56b, 56c and 56d are mounted at approximate two foot intervals along the shaft 52.

A plurality of roller drivers such as worms 58 are positioned on shaft 52. Each such worm 58 has a hexagonal inner bore specifically sized to permit the worm to be slideably advanced onto shaft 52 and to be rotatably engaged thereby, without a need for set screws, keyways or other locking mechanisms. The elimination of machined keyways, screw receiving holes, etc. from the outer surfaces of the shaft serves to eliminate the potential for chemical agents to become trapped within such structures as would likely promote or hasten degradation, corrosion, or other effects of such chemicals on the shaft 52 and/or worms 58.

Furthermore, the elimination of cut areas (e.g. keyways, set screw receiving holes, etc.) in the outer surface of the shaft ensures that the glass reinforcement fibers disposed longitudinally within the body of the shaft remain intact and fully functional.

Cylindrical spacers 60 are also positioned on shaft 52 for the purpose of holding the worms 58 a predetermined distance from one another. Each spacer 60 comprises a generally cylindrical section of PVC pipe or tubing. The inner bore of each spacer 60 need not be of hexagonal configuration as such spacers 60 do not perform radial force exerting functions and therefore do not need to be radially engaged upon the outer surface of shaft 52. In fact, such spacers 60 merely provide axial spacing between worms 58.

Although the assembly drawing of FIG. 1 shows several open spaces wherein the hexagonal shaft 52 is exposed, it will be appreciated that in most applications the entire length of shaft 52 will be covered by alternate worms 58 and spacers 60 so that no portion of the shaft remains exposed. Thus, the exposed portions of hexagonal shaft 52 are incorporated into FIG. 1 for illustration purposes only and are not a requisite or intended characteristic of the shaft assembly 50.

Figure 4:
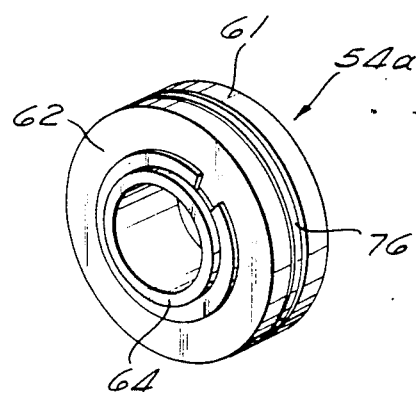
FIG. 4 is a perspective view of a chemical resistant thrust bearing of the type utilized at either end of the drive shaft assembly of the preferred drive mechanism of the present invention.
Figure 6:
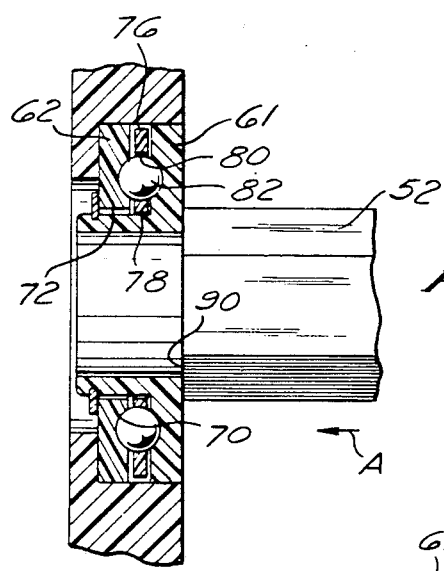
FIG. 6 is a cross-sectional view taken through line 6—6 of FIG. 3.
Figure 5:
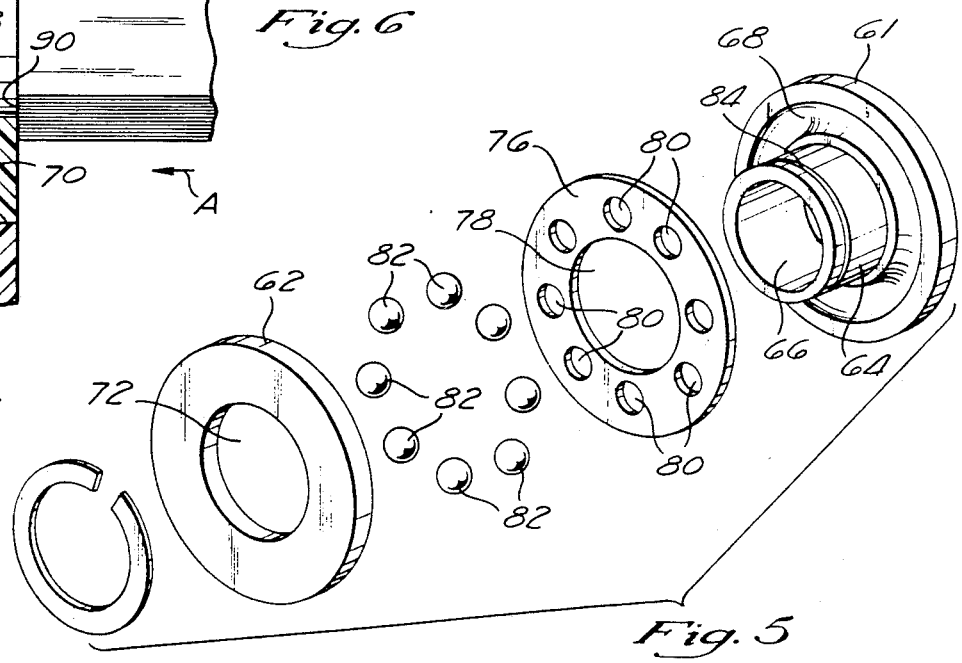
FIG. 5 is an exploded view of the bearing shown in FIG. 4.

The extreme longitudinal ends of hexagonal shaft 52 are machined to a generally cylindrical configuration so as to be slideably insertable into axial thrust bearings 54a, 54b. As shown in FIGS. 4-6 the axial thrust bearings 54a, 54b comprise ball bearings adapted to rotatably hold and support the drive shaft 52 and to prevent axial movement of the drive shaft assembly 50 in at least one direction. Each such bearing comprises a first disk element 61 and a second disk element 62. The first disk element 61 is provided with a raised annular hub 64 extending axially therefrom. A central aperture 66 is formed within the center of raised annular hub 64 and extends fully axially through the first disk member 60. A bearing raceway 68 in the form of a radial groove extends annularly around the inner surface of first disk element 61.

Second disk element 62 comprises a substantially flat disk shaped body having a bearing raceway 70 in the form of a radial groove extending annularly about and upon the inner surface thereof. A central aperture 72 is formed in the center of the second disk element 62 and extends fully axially therethrough.

A cage, separator or retainer 76 is positionable between the first disk element 61 and second disk element 62. Such retainer 76 comprises a round washer having a large central aperture 78 extending fully axially through the mid portion thereof and a plurality of smaller apertures 80 formed therearound. The smaller apertures 80 are spaced equidistant from one another.

Rolling elements or balls 82 are individually positionable within small apertures 80 of retainer 76. Thereafter, the first 61 and second 63 disk elements are juxtapositioned in the manner shown in FIG. 4. As a result, the rolling elements or balls 82 and retainer 76 are trapped between disk elements 61, 62 such that the rolling elements or balls 82 will reside and roll within bearing raceways 68, 70. A cut washer or other locking fixture is mounted on the exposed portion of annular flange 64 and seats within seating groove 84. Thus, the end bearing 54a, 54b is held together as a unitary structure.

Each cylindrically machined or otherwise down sized end portion of the hexagonal shaft 52 is inserted within the central aperture 66 of the bearing 54a, 54b such that shoulder 90 of shaft member 52 will abut against the inner face of the first disk element 61, thereby preventing the shaft 52 from moving further through the bearing 54a, 54b. Thus, the shaft is prevented from shifting axially in the direction of arrow A further than such point as where the shoulder 90 comes into abutment with the exposed surface of first disk element 61.

Each end bearing 54a, 54b is then mounted in a mounting block 92. The mounting block is firmly affixed to the surrounding machinery, thereby retaining bearing 54a, 54b in its desired position and serving to axially stabilize the shaft assembly 50.

The inner bearings 56a, 56b, 56c, 56d differ in construction from the end bearings 54a, 54b. As shown in FIGS. 7-9 the inner bearings 56a-d comprise open race type bearings, each having an outer block portion 100, an inner member 102 and a cage, separator or retainer 104.

The outer block 100 portion of each inner bearing 56a-d is mounted on or connected to the surrounding machinery housing or other structure and comprises a generally rectangular block member having a central aperture extending fully axially therethrough. A bearing raceway 106 in the form of a radial groove extends annularly around the inner surface of the central aperture of block member 100. A corresponding bearing raceway 108 in the form of a radial groove extends around the cylindrical outer surface of inner member 102.

The retainer 104 is provided with a plurality of arcuate or semicircular cut away regions 110. Each such cut away region 110 is sized and configured to receive a single rolling element or ball 112.

Each inner bearing 56-a-d is assembled by initially positioning the retainer 104 around the inner surface of inner member 102 such that the cut away regions 110 of retainer 104 are aligned with bearing raceway 108. The inner member 102 and retainer 110 are then partially advanced into the central aperture of block member 100 Rolling elements or balls 112 are individually inserted into each cut away region 110 of retainer 104 and the retainer 104/inner member 102 unit is then advanced fully into the central aperture of the block member 100 until the rolling elements or balls 112 snap into block member raceway 106. Thus, the individual elements of the bearing block 56a are easily assembled and subsequently snap fit together so as to be firmly frictionally held as a unit.

A hexagonal inner bore 114 extends fully axially through the center of inner member 102. Hexagonal inner bore 114 is sized and configured to be slideably advanceable over the outer surface of shaft 52 such that the hexagonal outer surface of the shaft 52 will engage the inner surfaces of aperture 114. Thus, shaft 52 is prevented from rotating independently from inner member 102. Such gripping of the hexagonal shaft member 52 within the hexagonal bore 114 of inner member 102 permits the inner bearing 56a to rotatably engage the shaft 52 without the need for forming of keyways, set screws, receiving indentations or providing other fixative means for connecting the shaft 52 to the inner bearing member 102.

To effect rotational movement of the drive assembly 50, a motor, preferably an A/C motor having an eddy current clutch is positioned adjacent or near the drive assembly 50. A drive gear 120 is rotatably connected to an output shaft of the motor and is positioned to mesh with shaft gear 122. Thus, rotational driving of shaft 52 occurs as a result of rotational movement of drive gear 120. Of course, a simple chain drive or other arrangement may be employed, however the use of a chemical resistant plastic or nylon gear drive is preferable as such arrangement is known to be highly dependable and to offer a relatively extended service life with desirable resistance to the effects of many chemicals.

The various components of the drive assembly 50 are made of materials which are resistant to the particular chemicals with which the drive assembly 50 is likely to come in contact For example, the drive gear 120 and shaft gear 122 may be made of nylon or PVC and the hexagonal shaft 52 is preferably made of pultruded fiberglass reinforced plastic.

Because the chemical resistant drive assembly of the present invention is formed of plastic components, rather than the high strength steels typically used in such machinery, it is preferable that the component parts be sized and configured so that they may interact with one another without placing undue strain on any specific region or point of any specific compoent as may cause breakage or fatigue thereof. For example, in the preferred embodiment, the hexagonally configured outer surface of the drive shaft 52 is sized and configured to snuggly engage the hexagonal inner bore of each worm 58 positioned thereon, thereby resulting in even distribution of pressure or rotational forces around and about the hexagonal shaft 52. Such even distribution of pressure or force serves to minimize the likelihood of component breakage as could occur if the rotational forces and stress were to be concentrated at specific points on the plastic shaft. Examples of prior art configurations wherein such localization of force or stress occurs include those wherein keyways or set screws are used to effect rotatable engagement of the shaft with various elements (e.g. worms) mounted thereon.

The block mountings 92 for end bearings 54a, 54b, as well as the outer bearing blocks 100 of inner bearings 56a-d will be made of a suitable plastic or other material resistant to the particular chemicals in use. In this preferred embodiment the blocks 54a, 54b, 100 are preferably made of plastic(s) which are resistant to most or all of the chemicals rountinely employed in circuit board manufacturing operations. Similarly, the worms 58 and spacers 60 are preferably formed of plastic which is resistant to most or all of the chemicals routinely employed in circuit board manufacturing operations. The rolling members or balls 82, 112 of the bearings are generally formed of glass such as chemical resistant borrosilicate glass or the like.

The above-described materials are generally used in most applications wherein corrosive, acidic and/or basic chemicals are employed. (e.g. developers, strippers, etchers).

ii. Modifications of the Preferred Embodiment for use in Contact with Glass Reactive or Glass Degrading Chemicals In certain circuit board manufacturing process directed to the removal of a tin-lead alloys and/or other plated materials, it is common practice to employ highly agressive stripping agents, including certain halides and/or compounds of boron such as fluoboric acid ($HBF_4$). Such compounds are known to react with, degrade and/or dissolve certain glass components such as the above-described glass rolling elements or balls 112. In such applications, it is desirable that the rolling elements or balls 112 be formed of nonglass materials such as ceramic or nylon thereby eliminating the degratory effect of the boron halides (e.g. fluoboric acid) on the balls.

Additionally, in such applications it is desirable that glass fibers and/or fillers be eliminated from the other plastic components used in the drive assembly. Thus, in applications wherein fluroborate compounds are used, it is preferable that the non-cylindrical drive be formed of material such as solid PVC or other non-glass filled plastic rather than the glass reinforced plastic described above.

iii. Operation of the Preferred Embodiment

With reference to FIG. 1, the presently preferred embodiment of the drive assembly 50 is operated in the following manner. The drive motor is energized so as to cause drive gear 120 to rotate. Rotational drive gear 120 causes corresponding rotation of shaft gear 122. Shaft gear 122 is firmly mounted on shaft 52 and causes corresponding rotation thereof The worms 58 are firmly mounted at various points on shaft 52 and, as shaft 52 turns, so do the worms 58. The worms intermesh with worm gears 36 mounted on conveyor rollers so as to cause at least some of the conveyor rollers to turn in a fixed rate relationship to the turning of shaft 52.

The block members surrounding the end and middle bearings are generally affixed or mounted to stable points on the surrounding machinery so as to firmly hold the shaft assembly 50 in place while the end and inner bearings permit rotation of the drive shaft. Other mounting structures may also be employed.

iv. Method for Assembling the Preferred Embodiment

One advantage of the conveyor drive assembly of the present invention is that it is easy to assemble and may be custom made to fit conveyors of varying length. To wit: the non-cylindrical drive shaft 52 is cut to its desired length. The longitudinal ends of the drive shaft may be machined down or otherwise altered so as to be slidably insertable into the axial thrust bearings 54a, 54b. Thereafter, a first axial thrust bearing 54a may be positioned on one end of the shaft and subsequently worms 58, spacers 60 and inner bearings 56a–d are slidably advanced onto the shaft in their desired order. When all of the required worms 58, spacers 60 and inner bearings 56a–d have been slidably advanced onto the shaft, the remaining axial thrust bearing 54b is then mounted on the opposite end of the shaft to complete the shaft assembly 50.

Thus, the drive assembly 50 of the present invention is easily assembled without the need for tools, screw drivers, etc. as is generally necessary in the assembly of prior art drive shafts wherein various set screws, keyways and other positioning and rotatable engagement means are employed.

Having described the invention with reference to a presently preferred embodiment, it is anticipated that various modifications, alterations and additions may be made to such embodiment without departing from the spirit and scope of the invention. It is intended that all such modifications, alterations and additions be included within the scope of the appended claims and the equivalents thereof

What is claimed is:

1. A drive assembly for rotationally driving a plurality of conveyor rollers mechanically connected thereto, said drive assembly comprising:
   an elongate, non-cylindrical drive shaft having first and second ends;
   a plurality of roller drivers disposed about the drive shaft at spaced locations along the length thereof; and
   a plurality of bearing assemblies disposed about the drive shaft at spaced locations along the length thereof, said bearing assemblies being sized and configured to hold and support said drive shaft in substantially fixed position relative to said conveyor rollers while permitting functional rotational movement of the drive shaft so as to drive said conveyor rollers;
   said bearing assemblies comprising first and second bearing members having a plurality of plastic rolling elements positioned therebetween to permit rotational movement of said first bearing member relative to said second bearing member.

2. The drive assembly of claim 1 wherein said non-cylindrical drive shaft comprises an elongate member of polygonal configuration.

3. The drive assembly of claim 1 wherein said drive shaft comprises an elongate member of hexagonal configuration.

4. The drive assembly of claim 1 wherein the drive shaft is formed of glass reinforced plastic.

5. The drive assembly of claim 4 wherein said glass reinforced plastic drive shaft is covered with a vinyl coating.

6. The drive assembly of claim 1 wherein said drive shaft is formed of plastic that is resistant to the glass degrading effects of fluoroborate compounds.

7. The drive assembly of claim 1 wherein the drive shaft is formed of solid polyvinyl chloride.

8. The drive assembly of claim 1 wherein said roller driver comprise a plurality of worm gears positioned at spaced intervals on said drive shaft.

9. The drive assembly of claim 8 wherein said worm gears comprise generally tubular members having non-cylindrical inner bores extending axially therethrough and grooved outer surfaces, the inner bores of said worm gears being formed to receive and engage the drive shaft.

10. The drive assembly of claim 1 wherein said plurality of bearing assemblies comprise:
    first and second axial thrust bearings mounted separately on said first and second longitudinal ends of the drive shaft, each of said thrust bearings being operative to rotatably hold and support the drive shaft while preventing longitudinal axial movement thereof in at least one direction; and
    at least one inner bearing positioned between said first and second longitudinal ends of said drive shaft, said at least one inner bearing being sized and configured to rotatably hold and support said drive shaft.

11. The drive assembly of claim 10 wherein said inner bearing further comprises:
    at least one inner bearing member rotatably disposed within an outer bearing member and having a central aperture extending axially therethrough;
    said central aperture being analagous in configuration to said non-cylindrical drive shaft so that said inner bearings may be slidably advanced onto said drive shaft to a desired position thereon and further such that the non-cylindrical outer surface of said drive shaft will rotatably engage the non-cylindrical inner surface of the bearing such that said inner bearing member will rotate in conjunction with said drive shaft while said outer bearing member remains stationary.

12. The drive assembly of claim 1 wherein said drive shaft is formed of glass reinforced plastic having a plurality of glass reinforcement fibers extending longitudinally therethrough.

13. A corrosion resistant drive assembly for rotationally driving a plurality of conveyor rollers mechanically connected thereto, said drive assembly comprising:
    an elongate, non-cylindrical drive shaft having first and second ends;
    a plurality of roller drivers disposed about said drive shaft at spaced locations along the length thereof;
    said drive shaft having an outer surface that is devoid of recessed areas as would retain quantities of said caustic chemicals therein;
    said outer surface of said drive shaft being of substantially smooth, non-cylindrical configuration;
    each of said roller drivers having an axial bore extending therethrough, said axial bores being of substantially smooth, non-cylindrical configuration analogous to the outer surface of said drive shaft so that each of said roller drivers is slidably advanceable onto said drive shaft and further such that said drive shaft will snugly, rotatably engage said roller drivers although said drive shaft is devoid of said recessed areas; and
    a plurality of bearing assemblies comprising first and second bearing members having a plurality of plastic rolling elements positioned therebetween to permit rotational movement of said first bearing member relative to said second bearing member.

14. The corrosion resistant drive assembly of claim 13 wherein said drive shaft is formed of glass reinforced plastic comprising plastic material with a plurality of glass fibers disposed therein.

15. The corrosion resistant drive assembly of claim 14 wherein said glass reinforced plastic drive shaft is covered with a vinyl coating.

16. The corrosion resistant drive assembly of claim 13 wherein said non-cylindrical drive shaft is polygonal in configuration.

17. The corrosion resistant drive assembly of claim 13 wherein said non-cylindrical drive shaft is hexagonal in configuration.

18. The corrosion resistant drive assembly of claim 13 wherein said drive shaft is devoid of recessed keyways formed therein 19. The corrosion resistant drive assembly of claim 13 wherein said drive shaft is specifically devoid of set screw receiving recesses formed therein.

20. The drive assembly of claim 13 wherein the drive shaft outer surface and the roller driver bores are analogously configured so that the outer surface of the drive shaft rotatably engages each roller driver and further such that pressure created by rotation will be evenly distributed about the outer surface of said drive shaft, thereby avoiding concentration of pressure on any single area of the shaft during rotation thereof.

21. The drive assembly of claim 14 wherein said glass reinforced plastic drive shaft includes a plurality of glass reinforcement fibers extending longitudinally therethrough and further wherein the outer surface of said drive shaft is devoid of recessed areas extending into said drive shaft as would result in disruption of any of said glass reinforcement fibers.

22. A chemical resistant drive assembly for rotationally driving a series of conveyor rollers mechanically connected thereto, said drive assembly and said conveyor rollers being disposable within a glass reactive chemical environment such as exists within certain chemical processing machinery said drive assembly comprising:
an elongate, non-cylindrical drive shaft having first and second ends;
a plurality of roller drivers disposed about said drive shaft at spaced locations along the length thereof; and
a plurality of bearing assemblies comprising first and second bearing members having a plurality of plastic rolling elements positioned therebetween to permit rotational movement of said first bearing member relative to said second bearing member;
said drive shaft and said roller drivers being formed of plastic material which is devoid of glass filler and glass reinforcement material so as to be substantially non-degradable in a glass reactive chemical environment.

23. The chemical resistant drive assembly for use in connection with glass reactive chemicals of claim 22 wherein said
bearing assemblies are disposed about the drive shaft at spaced locations along the length thereof, said bearing assemblies being sized and configured to hold and support said drive shaft in substantially fixed position relative to said conveyor rollers while permitting functional rotational movement of the drive shaft so as to accomplish driving of said conveyor rollers;
said rolling elements being formed of material that is substantially non-degradable in a glass reactive chemical environment.

24. The drive assembly of claim 23 wherein said rolling elements are formed of nylon.

25. The drive assembly of claim 23 wherein said rolling elements are formed of ceramic material.

26. A chemical resistant drive assembly for rotationally driving a series of conveyor rollers mechanically connected thereto, said drive assembly and said conveyor rollers being disposable within a reactive chemical environment such as exists with certain chemical processing machinery, said drive assembly comprising:
an elongate, non-cylindrical drive shaft having first and second ends;
a plurality of roller drivers disposed about said drive shaft at spaced locations along the length thereof;
said drive shaft being formed of glass reinforced plastic material so as to be substantially non-degradable in a corrosive chemical environment; and
a plurality of chemical resistant bearing assemblies disposed about the drive shaft at spaced locations along the length thereof, said chemical resistant bearing assemblies being sized and configured to hold and support said drive shaft in substantially fixed position relative to said conveyor rollers while permitting functional rotational movement of the drive shaft so as to accomplish driving of said conveyor rollers.

27. The chemical resistant drive assembly for use in connection with caustic chemicals of claim 26 wherein said drive assembly further comprises:
a plurality of chemical resistant bearing assemblies disposed about the drive shaft at spaced locations along the length thereof, said chemical resistant bearing assemblies being sized and configured to hold and support said drive shaft in substantially fixed position relative to said conveyor rollers while permitting functional rotational movement of the drive shaft so as to accomplish driving of said conveyor rollers;
said chemical resistant bearing assemblies comprising first and second bearing members having a plurality of rolling elements positioned therebetween to permit rotational movement of said first bearing member relative to said second bearing member;
said rolling elements being formed of material that is substantially non-degradable in a caustic chemical environment.

28. The drive assembly of claim 27 wherein said rolling elements are glass balls.

29. A corrosion resistant drive assembly for rotationally driving a series of conveyor rollers mechanically connected thereto in a corrosive chemical environment, said drive assembly comprising:
an elongate, non-cylindrical drive shaft having first and second ends, said drive shaft being formed of non-corroding, glass reinforced plastic comprising plastic material with a plurality of glass reinforcement fibers extending longitudinally therethrough;
a plurality of roller drivers disposed about said drive shaft at spaced locations along the length thereof;
said drive shaft having an outer surface that is devoid of recessed areas extending into said drive shaft as would result in disruption of said glass reinforcement fibers, and further being devoid of said recessed areas as would retain quantities of said corrosive chemicals therein;
said outer surface of said drive shaft being of substantially smooth, non-cylindrical configuration; and
each of said roller drivers having an axial bore extending therethrough, said axial bore being of substantially smooth non-cylindrical configuration analogous to said outer surface of said drive shaft so that each of said roller drivers is slidably advanceable onto said drive shaft and further such that said drive will snugly rotatably engage said roller drivers although said drive shaft is devoid of said recessed areas.

30. A chemical resistant drive assembly for rotationally driving a series of conveyor rollers mechanically connected thereto in a caustic chemical environment, said drive assembly comprising:
an elongate, non-cylindrical drive shaft having first and second ends;
a plurality of roller drivers disposed about said drive shaft at spaced locations along the length thereof;
said drive shaft and said roller drivers being formed of plastic material which is devoid of glass filler and glass reinforcement material;
a plurality of chemical resistant bearing assemblies disposed about said drive shaft at spaced locations along the length thereof, said chemical resistant bearing assemblies being sized and configured to hold and support said drive shaft in substantially fixed position relative to said conveyor rollers while permitting functional rotational movement of said drive shaft so as to accomplish driving of said conveyor roller;
said chemical resistant bearing assemblies comprising first and second bearing members having a plurality of rolling elements positioned therebetween to permit rotational movement of said first bearing member relative to said second bearing member;
said rolling elements being formed of plastic material.

31. The drive assembly of claim 30 wherein said rolling elements are formed of nylon.

32. A chemical resistant drive assembly for rotationally driving a series of conveyor rollers mechanically connected thereto in a caustic chemical environment said drive assembly comprising:
an elongate, non-cylindrical drive shaft having first and second ends;
a plurality of roller drivers disposed about said drive shaft at spaced locations along the length thereof;
said drive shaft and said roller drivers being formed of plastic material which is devoid of glass filler and glass reinforcement materials;
a plurality of chemical resistant bearing assemblies disposed about said drive shaft at spaced locations along the length thereof, said chemical resistant bearing assemblies being sized and configured to hold and support said drive shaft in substantially fixed position relative to said conveyor rollers while permitting functional rotational movement of said drive shaft so as to accomplish driving of said conveyor rollers;
said chemical resistant bearing assemblies comprising first and second bearing members having a plurality of rolling elements positioned therebetween to permit rotational movement of said first bearing member relative to said second bearing member; and
said rolling elements being formed of ceramic material.

33. A chemical resistant drive assembly for rotationally driving a series of conveyor rollers mechanically connected thereto in a caustic chemical environment, said drive assembly comprising:
an elongate, non-cylindrical drive shaft having first and second ends;
a plurality of roller drivers disposed about said drive shaft at spaced locations along the length thereof;
said drive shaft being formed of glass reinforced plastic material;
a plurality of chemical resistant bearing assemblies disposed about said drive shaft at spaced locations along the length thereof, said chemical resistant bearing assemblies being sized and configured to hold and support said drive shaft in substantially fixed position relative to said conveyor rollers while permitting functional rotational movement of said drive shaft so as to accomplish driving of said conveyor rollers;
said chemical resistant bearing assemblies comprising first and second bearing members having a plurality of rolling elements positioned therebetween to permit rotational movement of said first bearing member relative to said second bearing member;
said rolling elements being formed of plastic material.

34. A chemical resistant drive assembly for rotationally driving a series of conveyor rollers mechanically connected thereto in a caustic chemical environment, said drive assembly comprising:
an elongate, non-cylindrical drive shaft having first and second ends;
a plurality of roller drivers disposed about said drive shaft at spaced locations along the length thereof;
said drive shaft being formed of glass reinforced plastic material;
a plurality of chemical resistant bearing assemblies disposed about said drive shaft at spaced locations along the length thereof, said chemical resistant bearing assemblies being sized and configured to hold and support said drive shaft in substantially fixed position relative to said conveyor rollers while permitting functional rotational movement of said drive shaft so as to accomplish driving of said conveyor rollers;
said chemical resistant bearing assemblies comprising first and second bearing members having a plurality of rolling elements positioned therebetween to permit rotational movement of said first bearing member relative to said second bearing member;
wherein said rolling elements are glass balls.

35. A corrosion resistant drive assembly for rotationally driving a series of conveyor rollers mechanically connected thereto in a corrosive chemical environment, said drive assembly comprising:
an elongate, non-cylindrical drive shaft formed of non-corroding, glass reinforced plastic comprising plastic material with a plurality of glass reinforcement fibers extending longitudinally therethrough;
a plurality of roller drivers disposed about said drive shaft at spaced locations along the length thereof;
said drive shaft having an outer surface that is devoid of recessed areas extending into said drive shaft as would result in disruption of said glass reinforcement fibers, and further being devoid of said recessed areas as would retain quantities of said corrosive chemicals therein;
each of said roller drivers having an axial bore extending therethrough, said axial bores being of substantially smooth non-cylindrical configuration analogous to the outer surface of said drive shaft so that each of said roller drivers is slidably advanceable onto said drive shaft and further such that said drive shaft will snugly, rotatably engage said roller drivers.

36. A chemical resistant drive assembly for rotationally driving a series of conveyor rollers mechanically connected thereto in a glass reactive chemical environment said drive assembly comprising:

an elongate, non-cylindrical drive shaft formed of plastic material which is devoid of glass filler and glass reinforcement material;

a plurality of chemical resistant bearing assemblies disposed about said drive shaft at spaced locations along the length thereof, said chemical resistant bearing assemblies being sized and configured to hold and support said drive shaft in substantially fixed position relative to said conveyor rollers while permitting functional rotational movement of said drive shaft so as to accomplish driving of said conveyor rollers;

said chemical resistant bearing assemblies comprising first and second bearing members having a plurality of rolling elements positioned therebetween to permit rotational movement of said first bearing member relative to said second bearing member; and said rolling elements being formed of ceramic material.

* * * * *

UNITED STATES PATENT AND TRADEMARK OFFICE
CERTIFICATE OF CORRECTION

PATENT NO. : 5,011,004

DATED : April 30, 1991

INVENTOR(S) : Mark D'Amato

It is certified that error appears in the above—identified patent and that said Letters Patent is hereby corrected as shown below:

In Column 2, Line 54, delete "space" and insert therefore --spaced--.

In Column 3, Line 3, delete "chmeicals" and insert therefore --chemicals--.

In Column 3, Line 29 after "plastic", insert --or glass.--.

In Column 5, Line 67, delete "60" and insert therefore --61--.

In Column 6, Line 64, delete "56-a-d" and insert therefore --56 a-d--.

In Column 8, Line 7, delete "rountinely" and insert therefore --routinely--.

In Column 8, Line 23, delete "process" and insert therefore --processes--.

In Column 8, Line 24, delete "a".

UNITED STATES PATENT AND TRADEMARK OFFICE
CERTIFICATE OF CORRECTION

PATENT NO. : 5,011,004

DATED : April 30, 1991

INVENTOR(S) : Mark D'Amato

It is certified that error appears in the above-identified patent and that said Letters Patent is hereby corrected as shown below:

In Column 11, Line 55, delete "said" and insert --:--.
In Column 11, Line 56, before "bearing" insert --said--.

Signed and Sealed this

Thirteenth Day of October, 1992

Attest:

DOUGLAS B. COMER

*Attesting Officer*    *Acting Commissioner of Patents and Trademarks*